May 30, 1967  E. C. LARY ETAL  3,322,978
HALL EFFECT THERMIONIC CONVERTER BATTERY
Filed Nov. 29, 1963
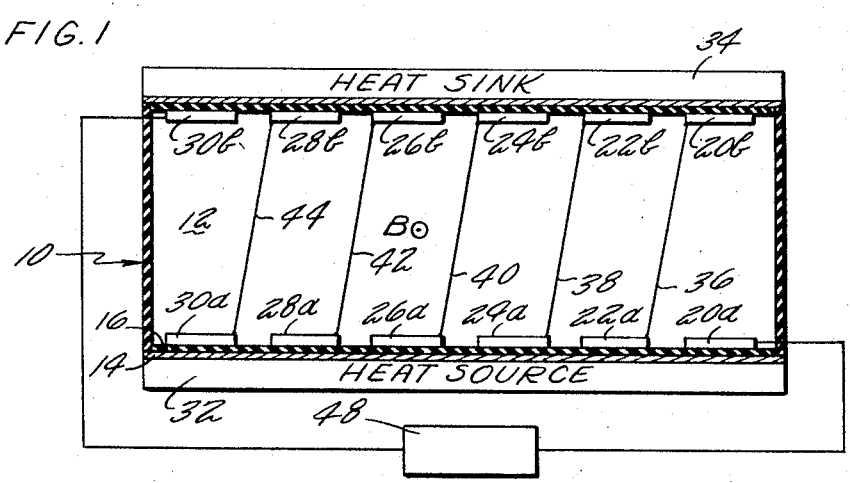
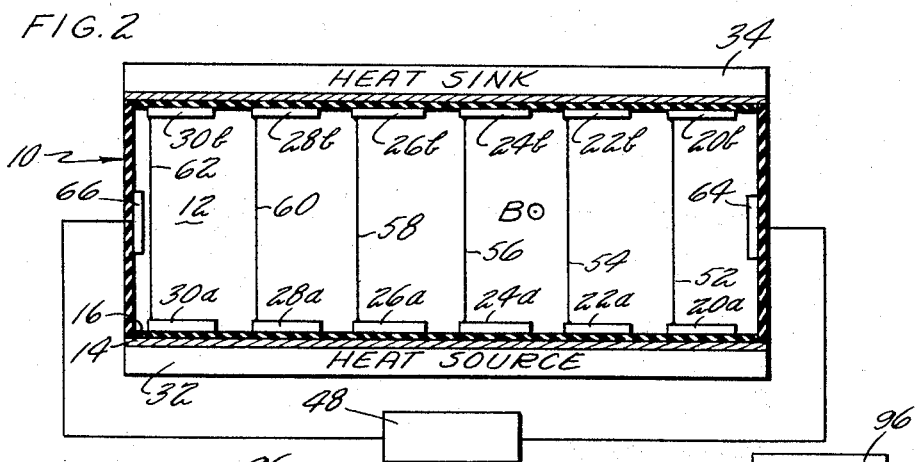
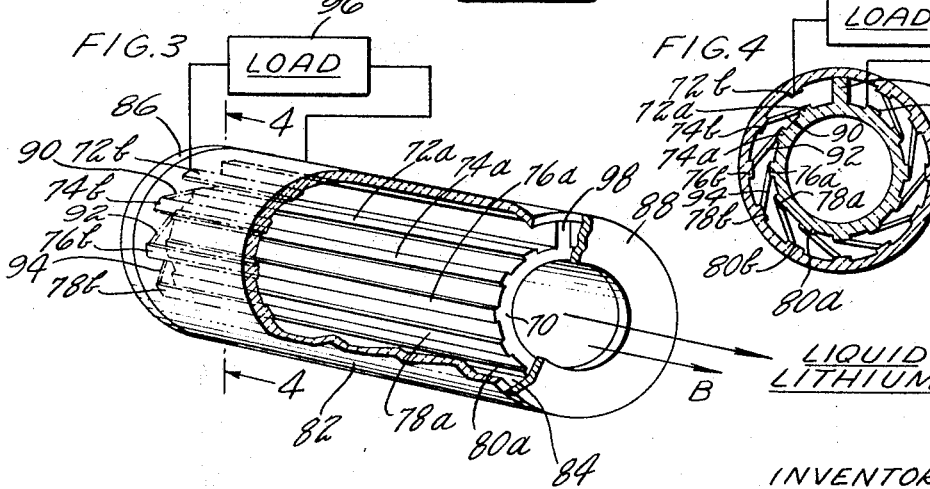
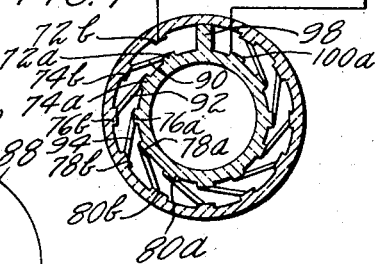
INVENTORS
EDMUND C. LARY
RUSSELL G. MEYERAND JR.
ROBERT H. BULLIS
BY David S. Fishman
ATTORNEY

United States Patent Office 3,322,978
Patented May 30, 1967

3,322,978
HALL EFFECT THERMIONIC CONVERTER BATTERY
Edmund C. Lary, Vernon, Robert H. Bullis, West Hartford, and Russell G. Meyerand, Jr., Glastonbury, Conn., assignors to United Aircraft Corporation, East Hartford, Conn., a corporation of Delaware
Filed Nov. 29, 1963, Ser. No. 326,876
11 Claims. (Cl. 310—4)

This invention relates to a novel thermionic converter battery. More particularly, this invention relates to a novel thermionic converter battery in which the Hall effect is employed in conjunction with a bank of thermionic converter cells to produce an output voltage approaching or equal to the sum of the voltages of the individual cells in the battery.

In the present invention a bank of thermionic converter cells is located in a common casing which defines a common vapor or plasma chamber for the thermionic converter cells. In one embodiment the individual thermionic converter cells are connected in series with the end cells of the bank being connected across a load. In another embodiment of the invention the individual thermionic converter cells are short-circuited and output electrodes within the battery casing are connected across a load. In both embodiments a magnetic field is introduced into the chamber in a direction perpendicular to the usual direction of electron flow between the cathodes and the anodes of the individual thermionic converter cells, the strength of the magnetic field being such that the cyclotron frequency of the free electrons in the plasma exceeds their collision frequency. The presence of the magnetic field transverse to the internal current flow of the thermionic cells gives rise to a Hall effect, i.e., an electric field perpendicular to the usual electric field and current flow between the cathodes and the anodes of the individual cells. This Hall potential allows adjacent cells placed with cathodes and anodes facing each other in a bank perpendicular to the magnetic field to assume different potentials while in the same plasma environment, and the individual cells may, therefore, be connected in series or short-circuited to give a total voltage of the bank greater than the voltage of any individual cell and approaching the sum of the voltages of the individual cells.

The Hall effect thermionic converter battery of the present invention combines the high D.C. output voltage of a series connection with the reliability characteristics of a parallel connection through the mechanism of the Hall effect. The output voltage of the battery approaches the sum of the voltages of the individual cells in the manner of a conventional series connection between battery cells. However, on failure of any thermionic generator element, such as by failure of an electrode or a conducting wire, the battery of the present invention continues to function by bypassing the inoperative element with the internal current flow in the common plasma bath. Thus, the failure of any one element does not destroy the operation of the battery but merely reduces the power produced by an amount equal to that previously produced by the inoperative cell.

Accordingly, one object of the present invention is to produce a novel battery employing themionic generators in conjunction with the Hall effect.

Another object of the present invention is to produce a novel thermionic converter battery which makes constructive use of the Hall effect.

Still another object of the present invention is to produce a novel Hall effect thermionic converter battery having the cumulative voltage characteristic of a series connection while at the same time having the reliability of a parallel connection.

Other objects and advantages will be apparent from the specification and claims, and from the accompanying drawings which illustrate an embodiment of the invention.

FIG. 1 is a diagrammatic representation of the preferred embodiment of the present invention wherein the end cells of the bank of thermionic converters are connected across the load.

FIG. 2 is a diagrammatic representation of an alternate configuration wherein output electrodes are connected across a load.

FIG. 3 is a diagrammatic representation of a modification of the FIG. 1 embodiment wherein the thermionic cells are in an annular array.

FIG. 4 is a view along line 4—4 of FIG. 3.

Referring now to FIG. 1, casing 10, shown for purposes of illustration in the shape of a rectangular box, defines a chamber 12. The bottom surface 14 of casing 10 is made of a good heat conducting material such as a high temperature metal and has a layer of electrical insulation 16 on the inner side. The electrical insulation 16 may be, for example, any refractory ceramic such as aluminum oxide and can be in any desired form such as a lamination or a spray deposit. The top surface of casing 10 is constructed similarly to the bottom surface just described, and the remaining four side surfaces are made of good heat insulating material and good electrical insulating materials such as aluminum oxide or beryllium oxide. The parts of casing 10 are joined together to make chamber 12 leak tight so that the vapor will not leak out or air leak in.

A plurality of individual thermionic converter cells are arranged in chamber 12 in a lineal bank. Six cells are shown in FIG. 1 for purposes of illustration, and each cell has an electron emitting cathode electrode and an electron collector anode electrode. The cathodes of the cells are labeled 20a through 30a and the corresponding anodes of the respective cells are labeled 20b through 30b. The cathodes and the anodes are supported on the bottom and top surfaces, respectively, of casing 10 and are electrically insulated from the casing and from each other by the layer of electrical insulation on the inner surfaces of the bottom and top portions of the casing. A heat source 32 abuts casing 14 and is in heat exchange communication with each of the cathodes, and a heat sink 34 similarly abutting the top of case 10 is in heat exchange communication with each of the anodes.

The thermionic cells of the FIG. 1 embodiment are connected in series by conductors 36, 38, 40, 42 and 44, each of which connects the anode of one cell to the cathode of the adjacent cell. The series connections made by conductors 36 through 44 are preferably made internally of chamber 12, the conductors being, for example, cupric nickel wires with an insulating coating. The end cells of the bank of thermionic cells are connected across a load 48, anode 30b being connected to one side of the load and cathode 20a being connected to the other side of the load.

Chamber 12 defines a common chamber for all of the thermionic converter cells, and chamber 12 contains a vapor which, when the battery is operating, provides a common space charge neutralization plasma for the thermionic cells. The vapor is preferably cesium gas; however, any other alkali metal vapor, or a rare gas, or any other vapor could be used, the alternatives having been listed in descending order of preference.

In the operation of the embodiment of FIG. 1, heat source 32 and heat sink 34 cooperate to establish a temperature difference between the cathodes and the anodes of the individual cells to start a current flow between the cathodes and the anodes of each cell in accordance with the usual operation of thermionic converters. Electrons are emitted from each cathode and flow toward the anodes of the respective cells through the common vapor bath. A magnetic field (B) is impressed across chamber 12 perpendicular to the usual direction of electron flow, i.e., perpendicular to the plane of the paper. The interaction between the current and the magnetic field results in the development of a longitudinally directed Hall electric field, i.e., an electric field between the sides of casing 10 and in the plane of the paper. However, since the sides of the casing are electrical insulators, no current can flow in the direction of the Hall field. As a result, the current path in chamber 12 is directly through each thermionic cell from the cathode to the anode thereof while adjacent cells are operated at different potentials due to the presence of the longitudinal Hall field. The end cells are connected across load 48 as shown, and the voltage across the load is equal to approximately the sum of the voltages of the individual cells.

The construction of FIG. 1 results in the advantage of series connection since the output voltage of the battery approaches the sum of the voltages across the individual cells. However, the reliability of parallel connections is also realized since the failure of any individual element, such as one of the conducting wires 36 through 44, a cathode, or an anode, will not terminate the operation of the battery; the current will simply bypass the defective element by continuing to flow current internally of the device to the next sound cell.

Referring now to FIG. 2 wherein parts similar to FIG. 1 are numbered as in FIG. 1, a second embodiment of the invention is shown. The FIG. 2 embodiment differs from FIG. 1 only in that the cathodes and anodes of each cell are short-circuited through conductors 52 through 62, respectively, internally of chamber 12 as in the FIG. 1 embodiment, and in the incorporation of additional electrodes 64 and 66, conveniently referred to as output electrodes.

In the operation of the FIG. 2 embodiment, as in the operation of FIG. 1, a magnetic field (B) is crossed with the internal electron flow of the individual thermionic cells so that a Hall potential is established longitudinally of the battery, i.e., between and perpendicular to the electrodes 64 and 66. However, in distinction of the FIG. 1 structure, the Hall field in FIG. 2 communicates with conducting surfaces 64 and 66 which are connected across load 48 so that a longitudinal current can flow in the direction of the Hall field. This longitudinal current in turn coacts with the magnetic field to establish a second Hall field extending in direction between the cathodes and the anodes of the individual cells. The resultant of the several currents and electric field is a current flow internal of the device from the cathode of one cell, such as 30a to the anode of the adjacent cell, such as 28b, thence through conductor 60 to cathode 28a and internally of the device to anode 26b, and so on to cathode 20a and thence to output electrode 64, thence through load 48 and back into the battery through electrode 66 from where it would flow to anode 30b and then through conductor 62 to cathode 30a to repeat the cycle.

The structure of FIG. 2, like FIG. 1, has the advantage of a series connection in that the output voltage of the battery across load 48 approaches the sum of the voltages across each thermionic cell while having the reliability of a parallel connection system, since the failure of any one element merely leads to an open circuit of the defective cell which allows passage of current internally of the device through the defective cell without a voltage contribution from the defective cell.

The embodiment shown in FIGS. 3 and 4 is a modification of the system of FIG. 1 in which the cathodes and anodes are arranged in coaxial annular arrays. The cathodes are strips mounted longitudinally on annular ceramic element 70. Five cathodes, items 72a through 80a are shown in FIG. 3 for purposes of illustration, but, as can be seen in FIG. 4, the cathode strips are preferably mounted around the entire surface of annular ceramic element 70. A second annular ceramic element 82 is coaxial with ceramic element 70, and a number of longitudinally directed anode strip elements are arranged around the inner side of element 82, each anode being radially displaced from a cathode and cooperating with a cathode to form an individual thermionic cell. The anodes 72b through 78b which correspond to the cathodes 72a through 80a are shown in the partial sectional view of FIG. 3. The annular elements 70 and 82 define an annular chamber 84 therebetween, and the ends of chamber 84 are sealed off by ceramic end elements 86, 88.

The cathodes and anodes of FIG. 3 are connected together in a manner similar to the FIG. 1 construction in that one electrode in each cell is connected to the other type of electrode of the adjacent cell, i.e., the connections are not between radially opposed elements but between one element and an element one removed from the radially opposed element. Thus, cathode 72a is connected to anode 74b by insulated conductor 90, cathode 74a is connected by insulated conductor 92 to anode 76b, and cathode 76a is connected to anode 78b by conductor 94, and so on. Anode 72b corresponds to anode 30b of FIG. 1 and is connected to one side of a load 96 while the other side of the load is connected to a cathode 100a (see FIG. 4) on the surface of element 70 which corresponds to cathode 20a of FIG. 1.

A heat source such as liquid lithium flows through the interior of element 70 to form the heat source for the thermionic converters. Electrons are emitted from the cathode elements into chamber 84 which contains a space charge neutralizing plasma, and a magnetic field (B) is established across chamber 84 perpendicular to the flow of electrons, i.e., in a direction parallel to the anode and cathode elements to cause the device to function as a battery having the combination of series and parallel characteristics possessed by the battery of FIG. 1. The Hall electric field established in the FIG. 3 embodiment extends azimuthally in chamber 84, and, therefore, it is necessary to prevent this field from closing on itself and short-circuiting. To this end, a ceramic insulating barrier element 98 extends between end walls 86 and 88 and between annular elements 70 and 82 to interrupt the Hall field and prevent it from closing upon itself. Anode element 72b, which corresponds to anode 30b of FIG. 1 and which is connected to one side of load 96, is on one side of barrier 98, and cathode element 100a connected to the other side of load 96 and which corresponds to cathode 20a of FIG. 1 is on the other side of barrier 98.

It is to be understood that the invention is not limited to the specific embodiment herein illustrated and described but may be used in other ways without departure from its spirit as defined by the following claims.

We claim:
1. A thermionic converter battery comprising
   a closed compartment containing a gas vapor in a relatively static condition,
   a plurality of electron emissive electrodes within said compartment along one wall thereof,
   a plurality of electron collector electrodes positioned within said compartment opposite said electron emissive electrodes,
   means for establishing a temperature difference between said electron emissive electrodes and said electron collector electrodes to generate a flow of electrons therebetween,
   means for establishing a magnetic field at least partially crossed with said flow of electrons,
   means for electrically connecting at least one electrode of each type to an electrode of the other type,
   a pair of output electrodes within said compartment, and means connecting said output electrodes across a load.

2. A thermionic converter battery as in claim 1 wherein one of said pair of output electrodes is an electron collector electrode, and the other of said pair of output electrodes is an electron emissive electrode.

3. A thermionic converter battery as in claim 1 wherein said electrical connecting means includes conductor means connecting each said electron emissive electrode with an electron collector electrode whereby said electrodes are connected electrically in series.

4. A thermionic converter battery as in claim 1 in which said output electrodes are additional electrodes positioned outside the electron flow path between said electron collector electrodes and said electron emissive electrodes.

5. A thermionic converter battery as in claim 1 wherein said electron emissive electrodes are in a first annular array,
and where said electron collector electrodes are in a second annular array,
said first and second arrays being coaxial.

6. A thermionic converter battery as in claim 5 in which said first and second arrays define an annular chamber therebetween, containing said vapor,
and includes means within said annular chamber for preventing short-circuiting of said vapor.

7. A thermionic converter battery as in claim 1 wherein the means for establishing a temperature difference between said electron emisive electrodes and said electron collector electrodes comprises
a heat source in heat exchange communication with said electron emissive electrodes,
and a heat sink in heat exchange communication with said electron collector electrodes.

8. A thermionic converter battery as in claim 7 including means for electrically insulating said electrodes from said heat source and said heat sink.

9. A thermionic converter battery as in claim 1 wherein said vapor is a rare gas.

10. A thermionic converter battery as in claim 1 wherein said vapor is an alkali metal.

11. A thermionic converter battery as in claim 10 wherein said alkali metal vapor is cesium.

References Cited

UNITED STATES PATENTS

| | | | |
|---|---|---|---|
| 1,717,413 | 6/1929 | Rudenberg | 310—4 |
| 2,231,676 | 2/1941 | Muller | 313—162 X |
| 2,915,652 | 12/1959 | Hatsopoulos | 310—4 |
| 3,110,823 | 11/1963 | Gabor | 310—4 |
| 3,148,291 | 9/1964 | Rosa | 310—11 |
| 3,149,247 | 9/1964 | Cobine | 310—11 |
| 3,176,165 | 3/1965 | Lawrence | 310—4 |
| 3,202,844 | 8/1965 | Hatch | 310—4 |

FOREIGN PATENTS 734,201   7/1955   Great Britain.

MAX L. LEVY, *Primary Examiner.*

D. X. SLINEY, *Assistant Examiner.*